US006795513B2

United States Patent
Jechoux et al.

(10) Patent No.: US 6,795,513 B2
(45) Date of Patent: *Sep. 21, 2004

(54) CHANNEL ESTIMATION SEQUENCE AND METHOD OF ESTIMATING A TRANSMISSION CHANNEL WHICH USES SUCH A CHANNEL ESTIMATION SEQUENCE

(75) Inventors: Bruno Jechoux, Rennes (FR); Marian Rudolf, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/351,478

(22) Filed: Jan. 27, 2003

(65) Prior Publication Data

US 2003/0138063 A1 Jul. 24, 2003

Related U.S. Application Data

(62) Division of application No. 09/960,938, filed on Sep. 25, 2001, now Pat. No. 6,553,082.

(30) Foreign Application Priority Data

Oct. 2, 2000 (FR) .......................................... 00 12761

(51) Int. Cl.[7] .............................................. H03D 1/00
(52) U.S. Cl. ...................................... 375/343; 375/295
(58) Field of Search ................................ 375/343, 354, 375/364, 365, 295

(56) References Cited

U.S. PATENT DOCUMENTS 6,553,082 B2 * 4/2003 Jechoux et al. ............. 375/343

2001/0006541 A1  7/2001 Rudolf et al.

FOREIGN PATENT DOCUMENTS

| EP | 0 892 504 | 1/1999 |
| JP | WO02/23782 A1 | 3/2002 |
| WO | WO 00/14915 | 3/2000 |
| WO | WO 00/54424 | 9/2000 |

OTHER PUBLICATIONS

C. Tellambura, et al. IEEE Communications Letters, vol. 2, No. 5, pp. 140–142, "Channel Estimation Using Aperiodic Binary Sequences", May 1, 1998.
P. Spasojevic, et al., 2000 IEEE International Symposium on Information Theory, p. 55, "ISI Channel Estimation Using Complementary Sequences", Jun. 25–30, 2000.
P. Spasojevic, et al., 2000 IEEE Transactions on Information Theory, vol. 47, No. 3, pp. 1145–1152, "Complementary Sequences For Isi Channel Estimation", Mar. 2001.
P. Spasojevic, pp. 1–176, "Sequence and Channel Estimation for Channels with Memory", Dec. 1999.

(List continued on next page.)

*Primary Examiner*—Temesghen Ghebretinsae
(74) *Attorney, Agent, or Firm*—Oblon, Spivak, McClelland, Maier & Neustadt, P.C.

(57) ABSTRACT

A channel estimation sequence including two concatenated sequences (S and G) respectively including two complementary sequences (s and g), which are extended periodically by extensions ($e_s^f$, $e_s^d$ and $e_g^f$, $e_g^d$) which constitute copies of their starting part and/or ending part and which are respectively concatenated at the end and/or start of the sequence. Also, a channel estimation method including transmitting the channel estimation sequence and receiving and correlating the received signal with the first complementary sequence (s), correlating the received signal with the second complementary sequence (g), adding the results of the two correlations.

11 Claims, 1 Drawing Sheet

OTHER PUBLICATIONS

3GPP TS 25.223 V3.7.0 (Sep. 2001)., 3rd Generation Partnership Project; Technical Specification Group Radio Access Network; Spreading and modulation (TDD) (Release 1999).

Dilip V. Sarwate et al., Proceedings of the IEEE, vol. 68, No. 5, pp. 593–619, "Crosscorrelation Properties of Pseudorandom and Related Sequences" May 1980.

B.M. Popovic, Electronic Letters, vol. 35, No. 17, pp. 1427–1428, "Efficient Golay Correlator", Aug. 19, 1999.

Ericsson, pp. 1–8, "New Rach Preambles with Low Auto-Correlation Sidelobes and Reduced Detector Complexity", Mar. 22–26, 1999.

U.S. patent application Ser. No. 09/740,863, Rudolf et al., filed Dec. 21, 2000.

U.S. patent application Ser. No. 09/749,543, Rudolf et al., filed Dec. 28, 2000.

U.S. patent application Ser. No. 10/351,478, Jechoux et al., filed Jan. 27, 2003.

* cited by examiner

CHANNEL ESTIMATION SEQUENCE AND METHOD OF ESTIMATING A TRANSMISSION CHANNEL WHICH USES SUCH A CHANNEL ESTIMATION SEQUENCE

CROSS REFERENCE TO RELATED APPLICATION

This application is a divisional application of and claims the benefit of the earlier filing date of co-pending U.S. patent application Ser. No. 09/960,938, filed on Sep. 25, 2001 now U.S. Pat. No. 6,553,082.

FIELD OF THE INVENTION

The present invention concerns a channel estimation sequence intended to be transmitted by a transmitter to a receiver via a channel. Such a sequence is for example used in a method of estimating a transmission channel which is also the object of the present invention. The result of this channel estimation method is an optimum estimation of the delays, phases and attenuations of the different paths in the case of a channel with a single path or multiple paths. As will be understood later, this optimum estimation is obtained in a time window with a duration which is determined and which can therefore be chosen when the channel estimation sequence is constructed.

DISCUSSION OF THE BACKGROUND

In a telecommunications system, the information flows between transmitters and receivers by means of channels. FIG. 1 illustrates a model, discrete in time, of the transmission chain between a transmitter 1 and receiver 2 by means of a transmission channel 3. In general terms, the transmission channels can correspond to different physical media, radio, cable, optical, etc, and to different environments, fixed or mobile communications, satellites, submarine cables, etc.

Because of the many reflections to which the waves transmitted by the transmitter 1 may be subject, the channel 3 is a so-called multipath channel because between the transmitter 1 and receiver 2 there are generally obstacles which result in reflections of the waves propagating then along several paths. A multipath channel is generally modelled as indicated in FIG. 1, that is to say it consists of a shift register 30 having L boxes in series (here L=5) referenced by an index k which can take the values between 1 and L and whose contents slide towards the right in FIG. 1 each time a symbol arrives at its entry. The exit from each box of index k is subjected to a filter 31 which represents the interference undergone and which acts on the amplitude with an attenuation $\alpha_k$, gives a phase shift $\alpha_k$ and a delay $r_k$. The output of each filter 31 is then summed in an adder 32. The overall pulse response thus obtained is denoted h(n). This pulse response of the channel h(n) can be written in the form:

$$h(n) = \sum_{k=1}^{L} a_k \delta(n - r_k) e^{j\alpha_k}$$

where $\delta(n)$ representing the Dirac pulse, $\delta(n-r_k)$ denotes a delay function of the value $r_k$.

The output of the adder 32 is supplied to the input of an adder 33 in order to add a random signal, modelled by a white Gaussian noise w(n), which corresponds to the thermal noise present in the telecommunications system.

It will be understood that, if the transmitter 1 transmits the signal e(n), the signal r(n) received by the receiver 2 can be written in the form:

$$r(n) = e(n) * h(n) + w(n)$$

$$= e(n) * \sum_{k=1}^{L} a_k \delta(n - r_k) e^{j\alpha_k} + w(n)$$

$$= \sum_{k=1}^{L} a_k e(n - r_k) e^{j\alpha_k} + w(n)$$

The operator * designates the convolution product, defined in general terms by the following equation:

$$c(n) = a(n) * b(n) = \sum_{m=-\infty}^{+\infty} a(m) \cdot b(n - m)$$

In order to counteract the distortion caused in the transmitted signal e(n) by the channel 3, it is necessary to determine or estimate at each instant the characteristic of the channel 3, that is to say estimate all the coefficients $a_k$, $r_k$ and $a_k$ of the model of the channel 3 depicted in FIG. 1. It is necessary to repeat this estimation operation at a more or less great frequency according to the speed with which the characteristics of the channel change.

A widespread method of estimating the channel consists of causing to be transmitted, by the transmitter 1, pilot signals e(n) which are predetermined and known to the receiver 2 and comparing the signals r(n) received in the receiver 2, for example by means of an aperiodic correlation, with those which are expected there in order to deduce therefrom the characteristics of the channel 3 between the transmitter 1 and receiver 2.

It should be stated that the aperiodic correlation of two signals of length N has a total length 2N−1 and is expressed, from the convolution product, by the following equation:

$$\varphi_{e,b}(n) = a^*(-n) * b(n) = \sum_{m=-(N-1)}^{N-1} a(m) \cdot b(m+n)$$

for two signals a(n) and b(n) of finite length N, where the sign to the exponent * denotes the complex conjugate operation.

The result of the aperiodic correlation operation constitutes the estimate of the pulse response of the channel.

The aperiodic correlation of the signal r(n) received by the receiver 2 with the signal e(n) sent by the transmitter 1 and known to the receiver 2 can therefore be written as follows:

$$\varphi_{e,r}(n) = r(n) * e^*(-n)$$

$$= [e(n) * h(n) + w(n)] * e^*(-n)$$

$$= \varphi_{e,e^*h}(n) + \varphi_{e,w}(n)$$

$$= \varphi_{e,e}(n) * h(n) + \varphi_{e,w}(n)$$

In practice the sequence e(n) sent by the transmitter 1 will be chosen so that the autocorrelation $\phi_{e,e}(n)$ tends towards $k \cdot \delta(n)$, k being a real number, and $\phi_{e,w}(n)/\phi_{e,e}(n)$ tends towards 0. It is because the aperiodic correlation can then be written:

$$\varphi_{e,r}(n) = k \cdot \delta(n) * h(n) + \varphi_{e,w}(n)$$

$$= k \cdot h(n) + \varphi_{e,w}(n)$$

Because $\phi_{e,w}(n)$ is negligible compared with $\phi_{e,e}(n)$, it is therefore possible to write:

$$\phi_{e,r}(n) \approx k \cdot h(n)$$

It can then be seen that, having regard to the above hypotheses, the result of the aperiodic correlation of the signal r(n) received by the receiver 2 with the signal e(n) transmitted by the transmitter 1 and known to the receiver 2 constitutes the estimate, of the pulse response of the channel 3.

It has been possible to show that there is no unique sequence e(n) for which the aperiodic autocorrelation function $\phi_{e,e}(n)=k.\delta(n)$.

SUMMARY OF THE INVENTION

One object of the present invention consists of using pairs of complementary sequences which have the property that the sum of their aperiodic autocorrelations is a perfect Dirac function.

If two complementary sequences are called s(n) and g(n) with n=0,1, ..., N−1, it is therefore, by definition, possible to write:

$$\phi_{s,s}(n)+\phi_{g,g}(n)=k\cdot\delta(n) \quad (1)$$

Several methods are known in the literature for constructing such complementary sequences: Golay complementary sequences, polyphase complementary sequences, Welti sequences, etc.

The aim of the present invention is therefore to propose a method of estimating a transmission or telecommunications channel which uses complementary sequences.

More precisely, the aim of the present invention is to propose a channel estimation sequence intended to be transmitted by a transmitter to a receiver via a channel so that it can implement a channel estimation method, said channel estimation sequence consisting of two concatenated sequences respectively consisting of two complementary sequences. As for the channel estimation method, this consists, on the transmitter side, of transmitting said channel estimation sequence and, on the receiver side, of a correlation process consisting of correlating said signal received with the first of said complementary sequences, correlating said received signal with the second of said delayed complementary sequences, adding the results of the said two correlations, and deducing the said characteristics of the said channel from the result of the said correlation process.

According to the present invention, the said two complementary sequences are extended periodically by extensions which constitute replicas of their starting part and/or ending part and which are respectively concatenated at the end and/or start of the sequence.

According to another characteristic of the present invention, the lengths of the said extensions are such that their sum is greater than or equal to the length of the channel.

According to another characteristic of the present invention, the lengths of the said extensions are equal to the same value.

The present invention also concerns a method of estimating the characteristics of a transmission channel between a transmitter and a receiver implementing a channel estimation sequence as has just been described.

BRIEF DESCRIPTION OF DRAWINGS

The characteristics of the invention mentioned above, as well as others, will emerge more clearly from a reading of the following description of an example embodiment, the said description being given in relation to the accompanying drawings, amongst which.

According to the invention, the channel estimation sequence $S^E$ consists of two concatenated sequences S and G (the second sequence G is shifted in time by the length of the first sequence S), respectively formed from two complementary sequences s and g.

For example, the said two sequences s and g are Golay complementary sequences, or polyphase complementary sequences, or Welti sequences, etc. In general terms, they are complementary since the sum of their aperiodic autocorrelations is a perfect Dirac function. They therefore satisfy the following equation:

$$\phi_{s,s}(n)+\phi_{g,g}(n)=k\cdot\delta(n) \quad (1)$$

Each complementary sequence s and g has a length of N. They can therefore be written:

$$s=\{s_1 s_2 s_3 \ldots s_N\} \text{ and}$$

$$g=\{g_1 g_2 g_3 \ldots g_N\}$$

According to the present invention, in order to obtain the sequences S and G, the sequences s and g are extended by extensions consisting of the replicas of their starting part and/or their ending part respectively concatenated at the end and/or start of the sequence. These are then referred to as periodic extensions.

Figure 1:
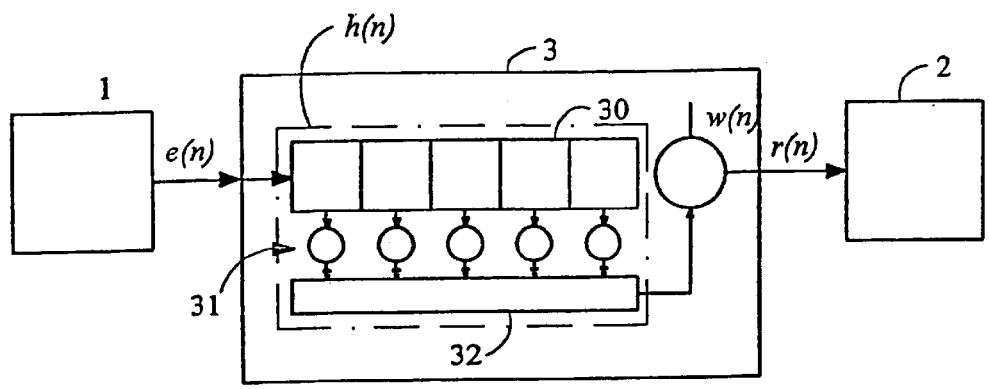
FIG. 1 is a schematic view of a transmission system.
Figure 2:
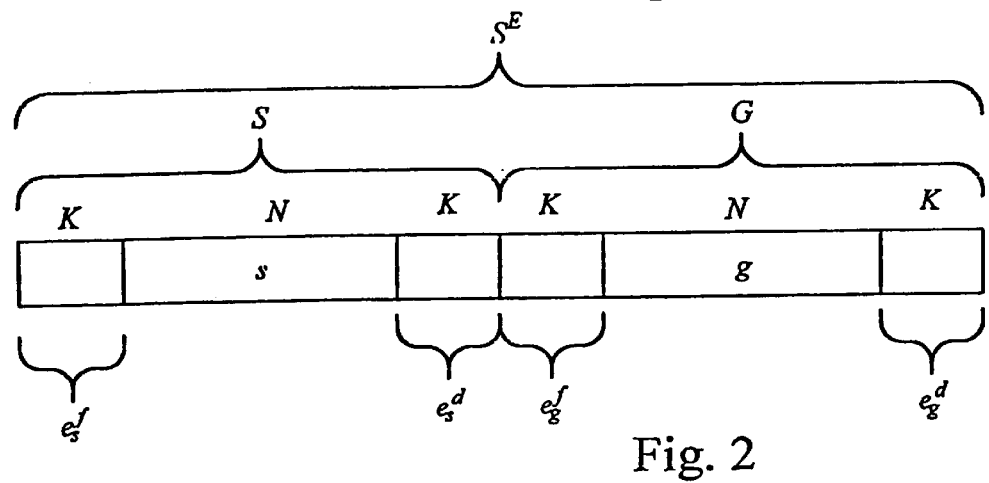
FIG. 2 is a diagram of a channel estimation sequence according to the present invention, transmitted by a transmitter of a transmission system.

In the embodiment depicted in FIG. 2, the sequences s and g are extended periodically to the right and left respectively by extensions $e_s^f$, $e_s^d$ and $e_g^f$, $e_g^d$. The extensions $e_s^f$ and $e_g^f$ are replicas of the respective end parts of the sequences s and g. As for the extensions $e_s^d$ and $e_g^d$, these are replicas of the respective starting parts of the same sequences s and g.

The lengths of the extensions are for example $K^f$ and $K^d$. According to the embodiment depicted in FIG. 2, the lengths $K^f$ and $K^d$ are equal to the same value K.

Thus, in the particular embodiment in FIG. 2, the extensions can be written as follows:

$$e_s^f = \{s_{N-K+1}, s_{N-K+2}, \ldots, s_N\}$$

$$e_s^d = \{s_1, s_2, \ldots, s_K\}$$

$$e_g^d = \{g_1, g_2, \ldots, g_K\}$$

$$e_g^f = \{g_{N-K+1}, g_{N-K+2}, \ldots, g_N\}$$

It should be noted that, in specific embodiments, either the length $K^f$ or the length $K^d$ could be zero.

Figure 3:
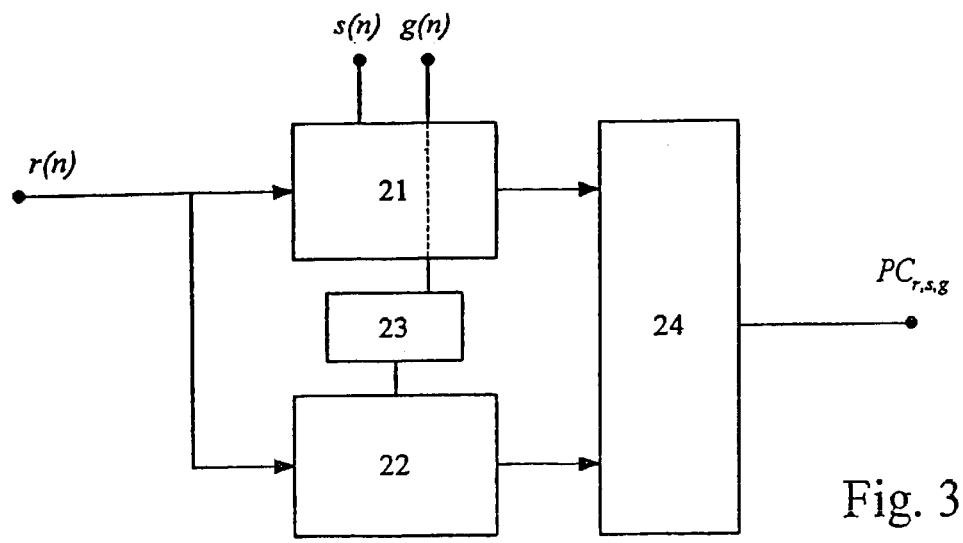
FIG. 3 is a block diagram of a correlation device according to the present invention.

In FIG. 3, the signal r(n) received by the receiver 2 is applied on the one hand to a first correlator 21 and on the other hand to a second correlator 22. The first correlator 21 establishes the correlation of the signal r(n) with the sequence s(n) which was used for producing the channel estimation sequence $S^E$ whilst the second correlator 22 establishes the correlation of the same signal r(n) with the other sequence g(n) which also served for producing the channel estimation sequence $S^E$ previously delayed, in a delay 23, by the sum of the length N of the first sequence s(n) added to the lengths $K^d$ and $K^f$ of the left-hand extension $e_s^d$ of the first sequence s(n) and of the right-hand extension $e_g^f$ of the second sequence g(n). Thus the first correlator 21 fulfils the correlation function $\phi(r(n),s(n))$ whilst the second correlator 22 fulfils the function $\phi(r(n),g(n-N-K^d-K^f))$.

The respective outputs of the first and second correlators 21 and 22 are connected to the respective inputs of an adder 24 which then delivers the following correlation signal $PC_{r,s,g}$:

$$PC_{r,s,g} = \phi(r(n),s(n)) + \phi(r(n),g(n-N-K^d-K^f))$$

It is possible to show that in theory this correlation signal, in the window $[-K^f, K^d]$, is, to within a constant, a Dirac pulse.

This is because, where $K^f=K^d=K$, this correlation signal can be written:

$$\begin{aligned}PC_{e,s,g}(n) &= \varphi(e(n), s(n)) + \varphi(e(n), g(n-N-2K)) \\ &= \varphi(S(n), s(n)) + \varphi(S(n), g(n-N-2K)) + \\ &\quad \varphi(G(n-N-2K), s(n)) + \varphi(G(n-N-2K), g(n-N-2K))\end{aligned}$$

However, each of the terms of the second member of the equality is of length $2(N+K)-1$, which means that the intercorrelation terms $\phi(S(n),g(n-N-2K))$ and $\phi(G(n-N-2K),s(n))$ are zero for $n\in[-K,K]$ when K<N. Consequently, in the interval $[-K,K]$ with K<N, the correlation signal is reduced to:

$$\begin{aligned}PC_{e,s,g}(n) &= \varphi(S(n), s(n)) + \varphi(G(n-N-2K), g(n-N-2K)) \\ &= \varphi(S(n), s(n)) + \varphi(G(n), g(n)) \\ &= \varphi_{s,s}(n) + \varphi_{g,g}(n) \\ &= k\delta(n)\end{aligned}$$

Moreover, in general terms, the length of the correlation signal $PC_{r,s,g}$ is equal to $2N+K^f+K^d-1$.

In practice, it is possible to determine, from the position of the peak of the correlation signal $PC_{r,s,g}$ in an analysis window $[-K^f, K^d]$ included in the correlation signal, the position in time of the signal r(n) received by the receiver 2. In other words, it is possible to determine the delay $r_k$ generated by the channel 3. The characteristics of the peak in the analysis window also make it possible to determine the other characteristics of the channel 3, namely the attenuation $\alpha_k$ and the phase shift $\alpha_k$ generated by the channel 3. If the width $(K^f+K^d)$ of the analysis window $[-K^f, K^d]$ is greater than or equal to the length L of the channel 3, it is possible to perfectly determine the position in time of all the received signals r(n) of all the paths.

Outside this analysis window $[-K^f, K^d]$ it is also possible to determine the positions of the signals received but imperfectly. Such an analysis outside the window $[-K^f, K^d]$ can be carried out when the width $(K^f+K^d)$ of the window $[-K^f, K^d]$ is less than the length L.

What is claimed is:

1. A channel estimation sequence ($S^E$) configured to be transmitted by a transmitter to a receiver in a communication system for estimating a characteristic of transmission channel between the transmitter and the receiver, comprising:
   concatenated sequences S and G, wherein
   said sequence S comprises a first sequence s and at least one of an extension $e_s^f$ comprising a copy of a rear portion of the first sequence s and an extension $e_s^d$ comprising a copy of a front portion of sequence s, and
   said sequence G comprises sequence g complementary to the first sequence s and at least one of an extension $e_g^f$ comprising a copy of a rear portion of sequence g and an extension $e_g^d$ comprising a copy of a front portion of sequence g.

2. The channel estimation sequence according to claim 1, wherein a sum of a length $K_s^f$ of said extension $e_s^f$ and a length $K_s^d$ of said extension $e_s^d$ and a sum of a length $K_g^f$ of said extension $e_g^f$ and a length $K_g^d$ of said extension $e_g^d$ are each greater than a known channel delay (L).

3. The channel estimation sequence according to claim 1 or 2, wherein a length $K_s^f$ of said extension $e_s^f$, a length $K_s^d$ of said extension $e_s^d$, a length $K_g^f$ of said extension $e_g^f$, and a length $K_g^d$ of said extension $e_g^d$ are equal.

4. A method of estimating a characteristic of a transmission channel between a transmitter and a receiver, comprising:
   transmitting from said transmitter to said receiver a channel estimation sequence ($S^E$) comprising concatenated sequences S comprising sequence s and at least one of an extension $e_s^f$ comprising a copy of a rear portion of sequence s and an extension $e_s^d$ comprising a copy of a front portion of sequence s, and G comprising complementary sequence g and at least one of an extension $e_g^f$ comprising a copy of a rear portion of sequence g and an extension $e_g^d$ comprising a copy of a front portion of sequence g;
   receiving said channel estimation sequence ($S^E$) at said receiver;
   correlating the received channel estimation sequence ($S^E$) with sequence s so as to produce a first correlation result;
   correlating the complementary sequence g with the received channel estimation sequence ($S^E$) so as to produce a second correlation result; and
   adding said first correlation result and said second correlation result.

5. The method according to claim 4, wherein said correlating steps each comprise correlating over a time window $[-K^f, K^d]$, where a length $K^f$ corresponds to a length of said extension $e_s^f$ which is equal to a length of said extension $e_g^f$, and a length $K^d$ corresponds to a length of said extension $e_s^d$ which is equal to a length of said extension $e_g^d$.

6. The method according to claim 4 or 5, wherein a sum of a length $K_s^f$ of said extension $e_s^f$ and a length $K_s^d$ of said extension $e_s^d$ and a sum of a length $K_g^f$ of said extension $e_g^f$ and a length $K_g^d$ of said extension $e_g^d$ are each greater than a length L corresponding to a channel delay.

7. The method according to claim 4 or 5, wherein a length $K_s^f$ of said extension $e_s^f$, a length $K_s^d$ of said extension $e_s^d$, a length $K_g^f$ of said extension $e_g^f$, and a length $K_g^d$ of said extension $e_g^d$ are equal.

8. The method according to claim 6, wherein a length $K_s^f$ of said extension $e_s^f$, a length $K_s^d$ of said extension $e_s^d$, a length $K_g^f$ of said extension $e_g^f$, and a length $K_g^d$ of said extension $e_g^d$ are equal.

9. A communication system, comprising:
   a transmitter configured to transmit a channel estimation sequence ($S^E$) including concatenated sequences S comprising sequence s and at least one of an extension $e_s^f$ comprising a copy of a rear portion of sequence s and an extension $e_s^d$ comprising a copy of a front portion of sequence s, and G comprising complementary sequence g and at least one of an extension $e_g^f$ comprising a copy of a rear portion of sequence g and an extension $e_g^d$ comprising a copy of a front portion of sequence g; and a receiver configured to receive said channel estimation sequence ($S^E$), said receiver comprising a correlator configured to correlate the received channel estimation sequence ($S^E$) with sequence s and the complementary sequence g so as to produce a first correlation result and a second correlation result, and an adder configured to add said first correlation result and said second correlation result.

10. The communication system according to claim 9, wherein a sum of a length $K_s^f$ of said extension $e_s^f$ and a length $K_s^d$ of said extension $e_s^d$ and a sum of a length $K_g^f$ of said extension $e_g^f$ and a length $K_g^d$ of said extension $e_g^d$ are each greater than a known channel delay (L).

11. The communication system according to claim 9 or 10, wherein a length $K_s^f$ of said extension $e_s^f$, a length $K_s^d$ of said extension $e_s^d$, a length $K_g^f$ of said extension $e_g^f$, and a length $K_g^d$ of said extension $e_g^d$ are equal.

* * * * *